United States Patent
Wei (10) Patent No.: US 9,804,933 B2
(45) Date of Patent: Oct. 31, 2017

(54) SYSTEM DIFFERENTIAL UPGRADE METHOD, APPARATUS, AND MOBILE TERMINAL

(71) Applicant: Huawei Device Co., Ltd., Shenzhen (CN)

(72) Inventor: Zhonghui Wei, Shenzhen (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 166 days.

(21) Appl. No.: 14/445,282

(22) Filed: Jul. 29, 2014

(65) Prior Publication Data

US 2014/0372799 A1 Dec. 18, 2014

Related U.S. Application Data

(63) Continuation of application No. PCT/CN2013/070747, filed on Jan. 21, 2013.

(30) Foreign Application Priority Data

Jan. 29, 2012 (CN) .......................... 2012 1 0020390

(51) Int. Cl.
G06F 11/00 (2006.01)
G06F 11/14 (2006.01)
(Continued)

(52) U.S. Cl.
CPC ............ *G06F 11/1469* (2013.01); *G06F 8/68* (2013.01); *G06F 11/0793* (2013.01); *G06F 11/1433* (2013.01)

(58) Field of Classification Search
CPC .... G06F 8/68; G06F 11/1448; G06F 11/1458; G06F 11/1402
See application file for complete search history.

(56) References Cited

U.S. PATENT DOCUMENTS 6,237,144 B1 5/2001 Delo
6,438,749 B1 * 8/2002 Chamberlain ............ G06F 8/62
714/15
(Continued)

FOREIGN PATENT DOCUMENTS

CN 101038549 A 9/2007
CN 101697133 A 4/2010
(Continued)

OTHER PUBLICATIONS

Partial English Translation and Abstract of Chinese Patent Application No. CN101038549A, Part 1, Sep. 1, 2014, 4 pages.
(Continued)

*Primary Examiner* — Bryce Bonzo
*Assistant Examiner* — Jonathan Gibson
(74) *Attorney, Agent, or Firm* — Conley Rose, P.C.

(57) ABSTRACT

A system differential upgrade method and apparatus, and a mobile terminal are provided. The method includes: obtaining an upgrade script and upgrade data; upgrading a file to be upgraded according to the upgrade script and the upgrade data; generating, according to the file processing command that is being executed currently in the upgrade script, and the file to be upgraded corresponding to the file processing command that is being executed currently, rollback data and a rollback script corresponding to the file to be upgraded; and when the upgrade fails, executing the rollback script according to the rollback data. The apparatus includes an obtaining module, an upgrading module, a generating module, and an executing module. According to the embodiments of the present invention, when an upgrade fails, the rollback script is executed according to the rollback data, which may restore a system to that before the upgrade.

20 Claims, 6 Drawing Sheets

(51) Int. Cl.
*G06F 9/44* (2006.01)
*G06F 11/07* (2006.01)

(56) References Cited

U.S. PATENT DOCUMENTS

| | | | |
|---|---|---|---|
| 6,681,389 B1 | 1/2004 | Engel et al. | |
| 7,735,078 B1* | 6/2010 | Vaidya | G06F 9/44547 717/168 |
| 7,908,600 B2* | 3/2011 | Nguyen | G06F 11/1433 717/168 |
| 2002/0124245 A1* | 9/2002 | Maddux | G06F 8/60 717/176 |
| 2004/0083453 A1* | 4/2004 | Knight | G06F 11/323 717/113 |
| 2005/0132358 A1 | 6/2005 | Peev et al. | |
| 2005/0278399 A1 | 12/2005 | Herle et al. | |
| 2006/0004756 A1 | 1/2006 | Peleg et al. | |
| 2007/0006208 A1 | 1/2007 | Nguyen et al. | |
| 2007/0113225 A1* | 5/2007 | Felts | G06F 8/65 717/172 |
| 2007/0282951 A1* | 12/2007 | Selimis | H04L 67/06 709/205 |
| 2008/0059960 A1* | 3/2008 | Akiyoshi | G06F 9/4406 717/170 |
| 2008/0201705 A1* | 8/2008 | Wookey | G06F 8/68 717/175 |
| 2008/0270718 A1* | 10/2008 | Stocklein | G06F 11/1458 711/162 |
| 2009/0167871 A1* | 7/2009 | Usui | H04N 5/772 348/207.1 |
| 2009/0222811 A1* | 9/2009 | Faus | G06F 8/65 717/173 |
| 2009/0271779 A1 | 10/2009 | Clark | |
| 2009/0300727 A1* | 12/2009 | Shioyama | G05B 19/4186 726/4 |
| 2011/0209134 A1* | 8/2011 | Toda | G06F 8/665 717/170 |
| 2012/0210312 A1 | 8/2012 | Ma et al. | |

FOREIGN PATENT DOCUMENTS

| | | |
|---|---|---|
| CN | 101702730 A | 5/2010 |
| CN | 101710288 A | 5/2010 |
| CN | 102193805 A | 9/2011 |
| CN | 102231671 A | 11/2011 |
| CN | 102609328 A | 7/2012 |
| WO | 2007051958 A1 | 5/2007 |

OTHER PUBLICATIONS

Partial English Translation and Abstract of Chinese Patent Application No. CN101038549A, Part 2, Sep. 1, 2014, 2 pages.
Partial English Translation and Abstract of Chinese Patent Application No. CN102193805A, Part 1, Sep. 1, 2014, 4 pages.
Partial English Translation and Abstract of Chinese Patent Application No. CN102193805A, Part 2, Sep. 1, 2014, 2 pages.
Partial English Translation and Abstract of Chinese Patent Application No. CN102231671A, Part 1, Sep. 1, 2014, 13 pages.
Partial English Translation and Abstract of Chinese Patent Application No. CN102231671A, Part 2, Sep. 1, 2014, 4 pages.
Foreign Communication From a Counterpart Application, Chinese Application No. 201210020390.X Chinese Office Action dated Jul. 25, 2013, 6 pages.
Foreign Communication From a Counterpart Application, European Application No. 13740816.7, Extended European Search Report dated Oct. 2, 2014, 8 pages.
Foreign Communication From a Counterpart Application, PCT Application No. PCT/CN2013/070747, English Translation of International Search Report dated May 9, 2013, 2 pages.
Foreign Communication From a Counterpart Application, PCT Application No. PCT/CN2013/070747, English Translation of Written Opinion dated May 9, 2013, 11 pages.

* cited by examiner

SYSTEM DIFFERENTIAL UPGRADE METHOD, APPARATUS, AND MOBILE TERMINAL

CROSS-REFERENCE TO RELATED APPLICATIONS

This application is a continuation of International Application No. PCT/CN2013/070747, filed on Jan. 21, 2013, which claims priority to Chinese Patent Application No. 201210020390.X, filed on Jan. 29, 2012, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of communications technologies, and in particular, to a system differential upgrade method, an apparatus, and a mobile terminal.

BACKGROUND

An Over The Air (OTA) upgrade is a way that facilitates an update of device firmware by a user so as to fix a system bug. In an OTA upgrade, a data flow is generally carried over a network, such as a Global System for Mobile Communications (GSM), a Code Division Multiple Access (CDMA), or a Wideband Code Division Multiple Access (WCDMA), to update a target device or for data transmission. An OTA upgrade does not require downloading of a complete data package and is an upgrade performed on the basis of existing system software, which greatly saves time of an upgrade for a user and is therefore used more widely.

An OTA upgrade method in the prior art generally includes: starting an upgrade thread, reading content of an upgrade script from an upgrade package, where the upgrade script indicates progress bar display, and a file to be deleted, or a file to be patched, or a file to be added; and running an upgrade program sentence by sentence according to the content in the script.

The prior art has at least the following disadvantage:

During an existing OTA upgrade process, once a user cancels an upgrade or an upgrade fails accidentally, it is possible that a system runs improperly and even cannot start, resulting in a serious accident.

SUMMARY

To resolve the problem in the prior art that, a system cannot start and even an accident occurs due to an OTA upgrade failure and incapability of restoring the system, embodiments of the present invention provide a system differential upgrade method and apparatus, and a mobile terminal.

According to one aspect, an embodiment of the present invention provides a system differential upgrade method. The method includes: obtaining an upgrade script and upgrade data, where the upgrade script includes a file processing command, and the file processing command includes an identifier of a file to be upgraded; upgrading the file to be upgraded according to the upgrade script and the upgrade data, where the file to be upgraded corresponds to the identifier of the file to be upgraded in the file processing command; generating, according to the file processing command that is being executed currently in the upgrade script, and the file to be upgraded corresponding to the file processing command that is being executed currently, rollback data and a rollback script corresponding to the file to be upgraded; and executing the rollback script according to the rollback data when the upgrade fails.

According to another aspect, an embodiment of the present invention further provides a system differential upgrade apparatus. The apparatus includes: an obtaining module configured to obtain an upgrade script and upgrade data, where the upgrade script includes a file processing command and the file processing command includes an identifier of a file to be upgraded; an upgrading module configured to upgrade the file to be upgraded according to the upgrade script and the upgrade data obtained by the obtaining module, where the file to be upgraded corresponds to the identifier of the file to be upgraded in the file processing command; a generating module configured to generate, according to the file processing command that is being executed by the upgrading module currently and is in the upgrade script, and the file to be upgraded corresponding to the file processing command that is being executed currently, rollback data and a rollback script corresponding to the file to be upgraded; and an executing module configured to execute the rollback script according to the rollback data when the upgrade performed by the upgrading module fails.

According to still another aspect, an embodiment of the present invention further provides a mobile terminal, where the mobile terminal includes the foregoing system differential upgrade apparatus.

According to the file processing command that is being executed currently in an upgrade script and a file to be upgraded corresponding to the file processing command that is being executed currently, rollback data and a rollback script corresponding to the current file to be upgraded are generated. When the upgrade fails, the rollback script is executed according to the rollback data, which may restore a system to that before the upgrade, thereby avoiding a case that the system runs improperly and cannot start when the upgrade fails.

BRIEF DESCRIPTION OF THE DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

Embodiment 1

Figure 1:
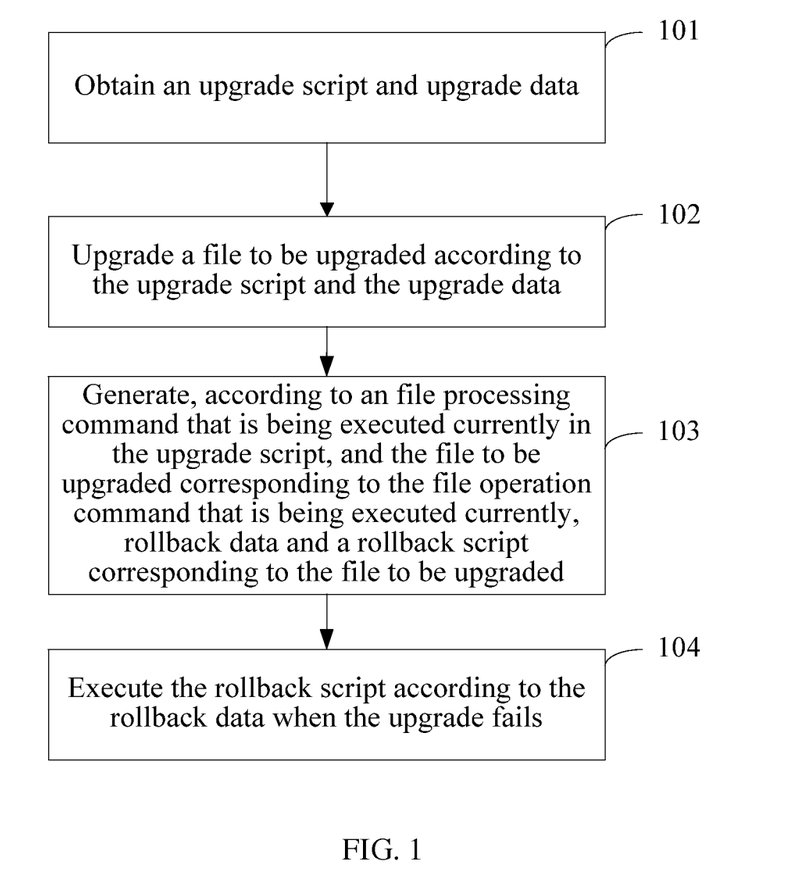
FIG. 1 is a flowchart of a system differential upgrade method according to Embodiment 1 of the present invention.

As shown in FIG. 1, an embodiment of the present invention provides a system differential upgrade method. The method includes:

Step 101: Obtain an upgrade script and upgrade data, where the upgrade script includes a file processing command, and the file processing command includes an identifier of a file to be upgraded.

Specifically, the upgrade script may include one or more file processing commands for deleting a file, patching a file, and adding a file.

Step 102: Upgrade the file to be upgraded according to the upgrade script and the upgrade data, where the file to be upgraded corresponds to the identifier of the file to be upgraded in the file processing command.

Specifically, this step includes: reading the file processing command in the upgrade script; and upgrading the file to be upgraded according to the read file processing command and the corresponding upgrade data.

Step 103: Generate, according to the file processing command that is being executed currently in the upgrade script, and the file to be upgraded corresponding to the file processing command that is being executed currently, rollback data and a rollback script corresponding to the file to be upgraded.

Step 104: When the upgrade fails, execute the rollback script according to the generated rollback data.

Preferably, if the current upgrade fails, an upgrade program returns a value indicating that the upgrade fails. When the value is received, the generated rollback script is executed, thereby restoring a system to that before the upgrade.

It should be noted that, in an actual application, there is no sequence for step 102 and step 103, which are performed simultaneously. For example, if a currently read file processing command is a file deletion command, step 103 is performed after the file processing command is read in step 102 but before the delete operation is performed in step 102. If the currently read file processing command is a patching command, step 103 is performed during a process of patching the file in step 102.

Further, the system differential upgrade method is preferably used for an OTA upgrade.

In the embodiment of the present invention, rollback data and a rollback script corresponding to a current file to be upgraded are generated according to the file processing command that is being executed currently in an upgrade script and the file to be upgraded corresponding to the file processing command that is being executed currently. When the upgrade fails, the rollback script is executed according to the rollback data, which may restore a system to that before the upgrade, thereby avoiding a case that the system runs improperly and cannot start when the upgrade fails.

Embodiment 2

Figure 2:
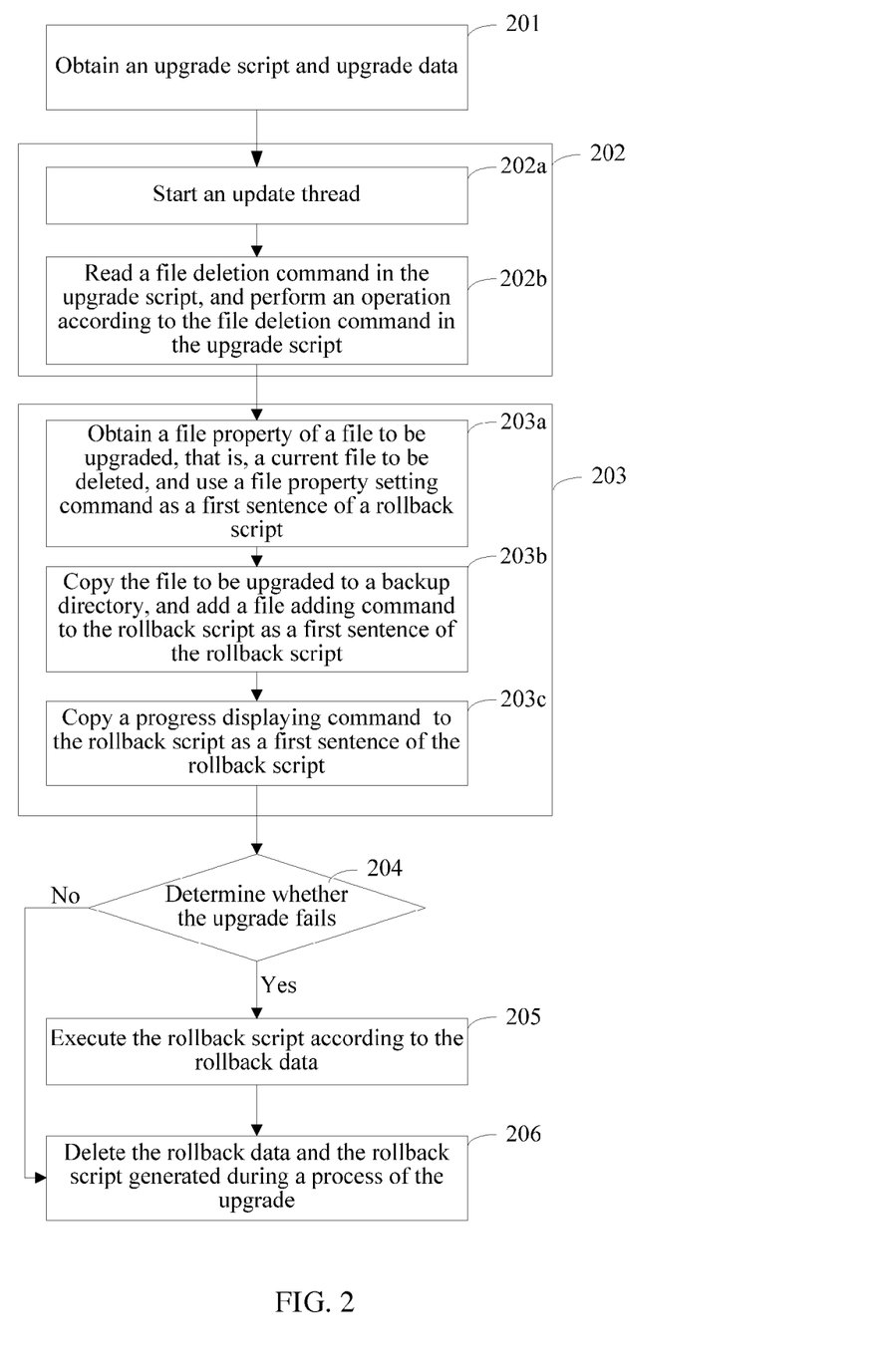
FIG. 2 is a flowchart of a system differential upgrade method according to Embodiment 2 of the present invention.

In this embodiment, an example that a current upgrade is to delete a file is used to describe in detail a system differential upgrade method according to the embodiment of the present invention. As shown in FIG. 2, the method includes:

Step 201: Obtain an upgrade script and upgrade data, where the upgrade script includes a file processing command, and the file processing command includes an identifier of a file to be upgraded.

Specifically, the file processing command includes a file deletion command, and the upgrade data is empty.

Step 202: Upgrade the file to be upgraded according to the obtained upgrade script and upgrade data.

Further, this step includes executing an operation of deleting the file according to the file deletion command in the upgrade script.

Specifically, this step includes:

Step 202*a*: Start an update thread UPDATE-BINARY.

Step 202*b*: Read the file deletion command DELETE in the upgrade script UPDATE-SCRIPT, and perform an operation, for example, deleting the file, according to the file deletion command DELETE in the upgrade script.

Step 203: Generate, according to the file processing command that is being executed currently in the upgrade script, and the file to be upgraded corresponding to the file processing command that is being executed currently, rollback data and a rollback script corresponding to the file to be upgraded.

Further, this step includes: before executing the file deletion command, saving file content, a file path, and a file property of the file to be upgraded that corresponds to the file deletion command as the rollback data. The file property generally includes a user identifier (UID), a group identifier (GID), an operation permission, or the like; and setting a file adding command and a file property setting command in the rollback script, where the file adding command and the file property setting command include the identifier of the file to be upgraded that corresponds to the file deletion command.

Preferably, this step further includes: setting a rollback progress displaying command in the rollback script. Specifically, a rollback progress may be displayed in a manner of displaying a progress bar, and a rollback progress may also be displayed in a manner of a percentage.

Specifically, this step includes:

Step 203*a*: Obtain the file property of the file to be upgraded, that is, the current file to be deleted, and use the file property setting command as a first sentence of the rollback script.

Step 203*b*: Copy the file to be upgraded to a backup directory, and add the file adding command as a first sentence of the rollback script.

Step 203*c*: Copy a progress displaying command SHOW_PROGRESS as a first sentence of the rollback script.

It should be noted that step 203 and step 202 are generally performed simultaneously. In this embodiment, step 203 is generally performed before a delete operation performed in step 202*b*.

Step 204: Determine whether the upgrade fails. If the upgrade fails, perform step 205; and if the upgrade succeeds, perform step 206.

Specifically, a value returned by an upgrade program may be used to determine whether the upgrade fails. If the value returned by the upgrade program indicates that the upgrade fails, perform step 205.

Further, a global variable A may be added. The global variable A may be set to two values: a1 and a2, where a1 represents a normal upgrade and a2 represents an upgrade rollback. By default, A is set to the value of a1, and when an error occurs in the upgrade, A is set to the value of a2.

Step 205: Execute the rollback script according to the rollback data.

After this step is completed, perform step 206.

Step 206: Delete the rollback data and the rollback script generated during a process of the upgrade.

In the embodiment of the present invention, rollback data and a rollback script corresponding to a current file to be upgraded are generated according to the file processing command that is being executed currently in an upgrade script and the file to be upgraded corresponding to the file processing command that is being executed currently. When the upgrade fails, the rollback script is executed according to the rollback data, which may restore a system to that before the upgrade, thereby avoiding a case that the system runs improperly and cannot start when the upgrade fails. Further, when the upgrade fails, a deleted file may be restored according to a file adding command in the rollback script, thereby restoring the system to that before the upgrade.

Embodiment 3

Figure 3:
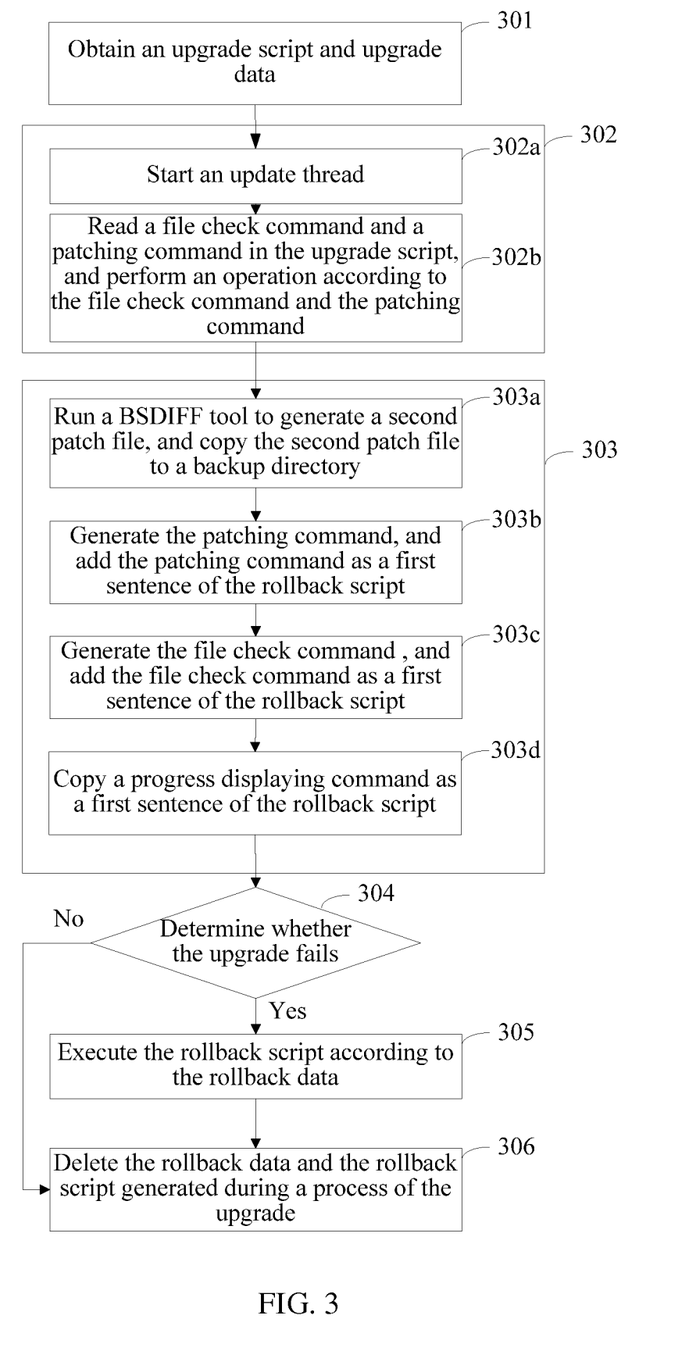
FIG. 3 is a flowchart of a system differential upgrade method according to Embodiment 3 of the present invention.

In this embodiment, an example that a current upgrade is to patch a file is used to describe in detail a system differential upgrade method according to the embodiment of the present invention. As shown in FIG. 3, the method includes:

Step 301: Obtain an upgrade script and upgrade data, where the upgrade script includes a file processing command, and the file processing command includes an identifier of a file to be upgraded.

Specifically, the file processing command includes a patching command, and the upgrade data includes a first patch file that upgrades the file to be upgraded corresponding to the patching command to a new file.

Further, the upgrade script further includes a file check command that is used to check the file to be upgraded corresponding to the patching command.

Step 302: Upgrade the file to be upgraded according to the upgrade script and the upgrade data.

Further, this step includes performing an operation of patching the file by using the first patch file in the upgrade data according to the patching command in the upgrade script.

Specifically, this step includes:

Step 302a: Start an update thread UPDATE-BINARY.

Step 302b: Read the file check command APPLY_PATCH_CHECK and the patching command APPLY_PATCH in the upgrade script UPDATE-SCRIPT, and perform the operation according to the file check command APPLY_PATCH_CHECK and the patching command APPLY_PATCH, that is, patching the file to be upgraded.

That is, the operation of patching the file to be upgraded specifically includes: checking the current file to be upgraded, that is, checking whether the file that needs to be patched (an original file) meets a requirement, for example, whether the file that needs to be patched is of a specified version; and if the current file to be upgraded meets a requirement, patching the file, that is, generating a patch file FILE.PATCH according to the current file to be upgraded FILE, and renaming the patch file FILE.PATCH as FILE.

Step 303: Generate, according to the file processing command that is being executed currently in the upgrade script, and the file to be upgraded corresponding to the file processing command that is being executed currently, rollback data and a rollback script corresponding to the file to be upgraded.

Specifically, this step includes: before generating the new file, saving a second patch file that restores the new file in step 302b to the file to be upgraded corresponding to the patching command as rollback data; and setting a patching command in the rollback script, where the patching command includes the identifier of the file to be upgraded that corresponds to the patching command in the upgrade script. That is, the second patch file is a patch file FILE.P that restores the FILE.PATCH before the renaming to the original file FILE.

Preferably, this step may further include: setting a file check command APPLY_PATCH_CHECK in the rollback script, where the file check command is used to check whether the new file meets a requirement, for example, whether the new file is of a specified version; and if the new file meets the requirement, applying the second patch file.

Preferably, this step may further include setting a rollback progress displaying command in the rollback script. Specifically, a rollback progress may be displayed in a manner of displaying a progress bar, and a rollback progress may also be displayed in a manner of a percentage.

Further, this step includes:

Step 303a: Run a BSDIFF tool to generate the second patch file, that is, the patch file FILE.P that restores the FILE.PATCH before the renaming to the original file FILE, and copy the second patch file to a backup directory.

Step 303b: Generate the patching command APPLY_PATCH, and add the patching command as a first sentence of the rollback script.

Step 303c: Generate the file check command APPLY_PATCH_CHECK, and add the file check command as a first sentence of the rollback script.

Step 303d: Copy a progress displaying command SHOW_PROGRESS as a first sentence of the rollback script.

It should be noted that, this step needs to be performed before the patch file FILE.PATCH is renamed as FILE in step 302b.

Step 304: Determine whether the upgrade fails. If the upgrade fails, perform step 305; and if the upgrade succeeds, perform step 306.

Specifically, a value returned by an upgrade program may be used to determine whether the upgrade fails. If the value returned by the upgrade program indicates that the upgrade fails, perform step 305.

Further, a global variable A may be added. The global variable A may be set to two values: a1 and a2, where a1 represents a normal upgrade and a2 represents an upgrade rollback. By default, A is set to the value of a1, and when an error occurs in the upgrade, A is set to the value of a2.

Step 305: Execute the rollback script according to the rollback data.

After this step is completed, perform step 306.

Step 306: Delete the rollback data and the rollback script generated during a process of the upgrade.

In the embodiment of the present invention, rollback data and a rollback script corresponding to a current file to be upgraded are generated according to the file processing command that is being executed currently in an upgrade script and the file to be upgraded corresponding to the file processing command that is being executed currently. When the upgrade fails, the rollback script is executed according to the rollback data, which may restore a system to that before the upgrade, thereby avoiding a case that the system runs improperly and cannot start when the upgrade fails. Further, when the upgrade fails, a patched file may be restored to the file to be upgraded before the patching according to a patching command in the rollback script, thereby restoring the system to that before the upgrade.

Embodiment 4

Figure 4:
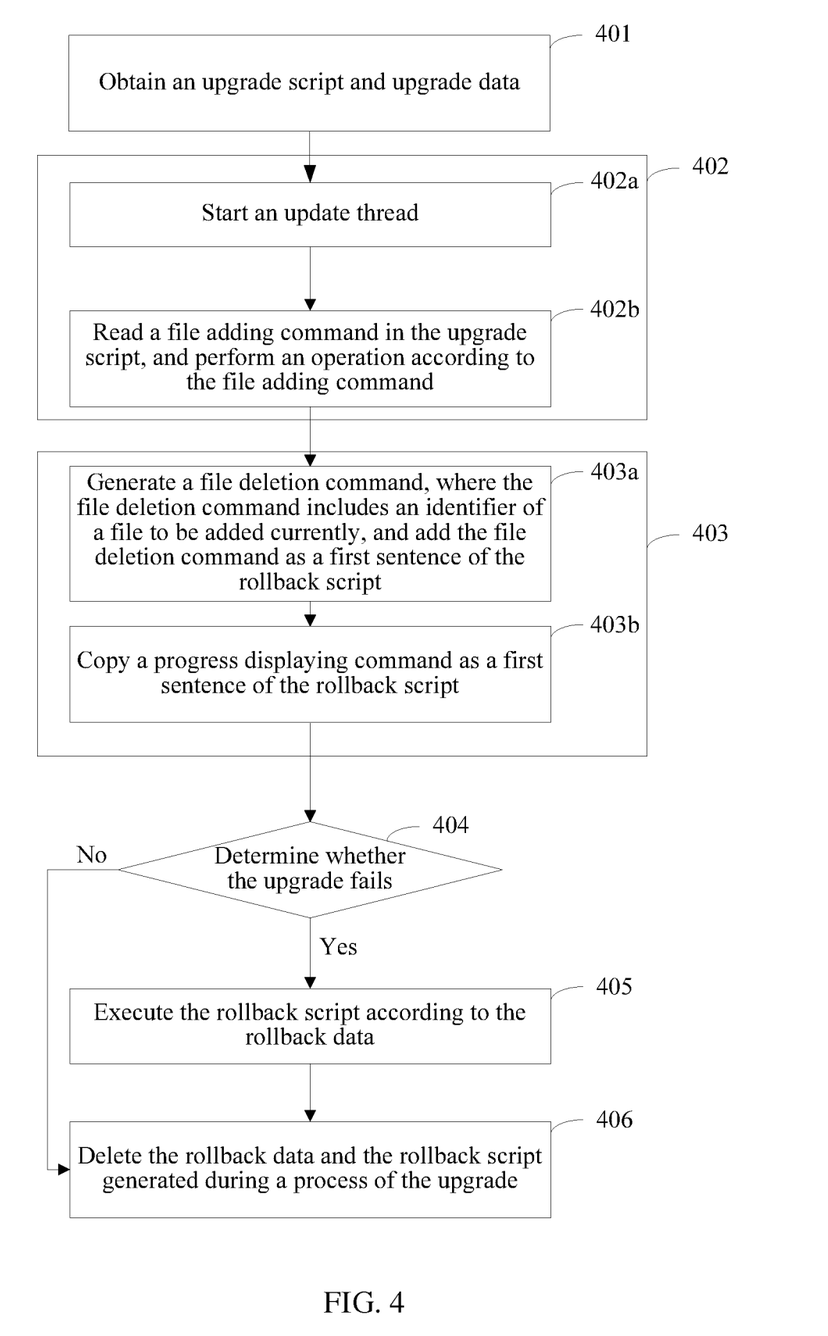
FIG. 4 is a flowchart of a system differential upgrade method according to Embodiment 4 of the present invention.

In this embodiment, an example that a current upgrade is to add a file is used to describe in detail a system differential upgrade method according to the embodiment of the present invention. As shown in FIG. 4, the method includes:

Step 401: Obtain an upgrade script and upgrade data, where the upgrade script includes a file processing command, and the file processing command includes an identifier of a file to be upgraded.

Specifically, the file processing command includes a file adding command, and the upgrade data includes file content, a file path, and a file property of the file to be upgraded that corresponds to the file adding command.

Step 402: Upgrade the file to be upgraded according to the obtained upgrade script and upgrade data.

Specifically, this step includes:

Step 402a: Start an update thread UPDATE-BINARY.

Step 402b: Read the file adding command PACKAGE_EXTRACT_FILE in the upgrade script UPDATE-SCRIPT, and perform an operation, for example, adding a file, according to the file adding command PACKAGE_EXTRACT_FILE.

Step 403: Generate, according to the file processing command that is being executed currently in the upgrade script, and the file to be upgraded corresponding to the file processing command that is being executed currently, rollback data and a rollback script corresponding to the file to be upgraded.

Specifically, this step includes setting a file deletion command in the rollback script, where the file deletion command includes the identifier of the file to be upgraded that corresponds to the file adding command. If the rollback data is empty, no rollback data is generated when the upgrade operation of adding a file is performed.

Preferably, this step further includes setting a rollback progress displaying command in the rollback script. Specifically, a rollback progress may be displayed in a manner of displaying a progress bar, and a rollback progress may also be displayed in a manner of a percentage.

Further, this step includes:

Step 403a: Generate the file deletion command, where the file deletion command includes the current file to be upgraded, that is, an identifier of the file to be added currently, and add the file deletion command as a first sentence of the rollback script.

Step 403b: Copy a progress displaying command SHOW_PROGRESS as a first sentence of the rollback script.

It should be noted that this step and step 402b are generally performed simultaneously.

Step 404: Determine whether the upgrade fails. If the upgrade fails, perform step 405; and if the upgrade succeeds, perform step 406.

Specifically, a value returned by an upgrade program may be used to determine whether the upgrade fails; and if the value returned by the upgrade program indicates that the upgrade fails, perform step 405.

Further, a global variable A may be added. The global variable A may be set to two values: a1 and a2, where a1 represents a normal upgrade, and a2 represents an upgrade rollback. By default, A is set to the value of a1, and when an error occurs in the upgrade, A is set to the value of a2.

Step 405: Execute the rollback script according to the rollback data.

After this step is completed, perform step 406.

Step 406: Delete the rollback data and the rollback script generated during a process of the upgrade.

In the embodiment of the present invention, rollback data and a rollback script corresponding to a current file to be upgraded are generated according to the file processing command that is being executed currently in an upgrade script and the file to be upgraded corresponding to the file processing command that is being executed currently. When the upgrade fails, the rollback script is executed according to the rollback data, which may restore a system to that before the upgrade, thereby avoiding a case that the system runs improperly and cannot start when the upgrade fails. Further, when the upgrade fails, an added file may be deleted according to a file deletion command in the rollback script, thereby restoring the system to that before the upgrade.

Embodiment 5

Figure 5:
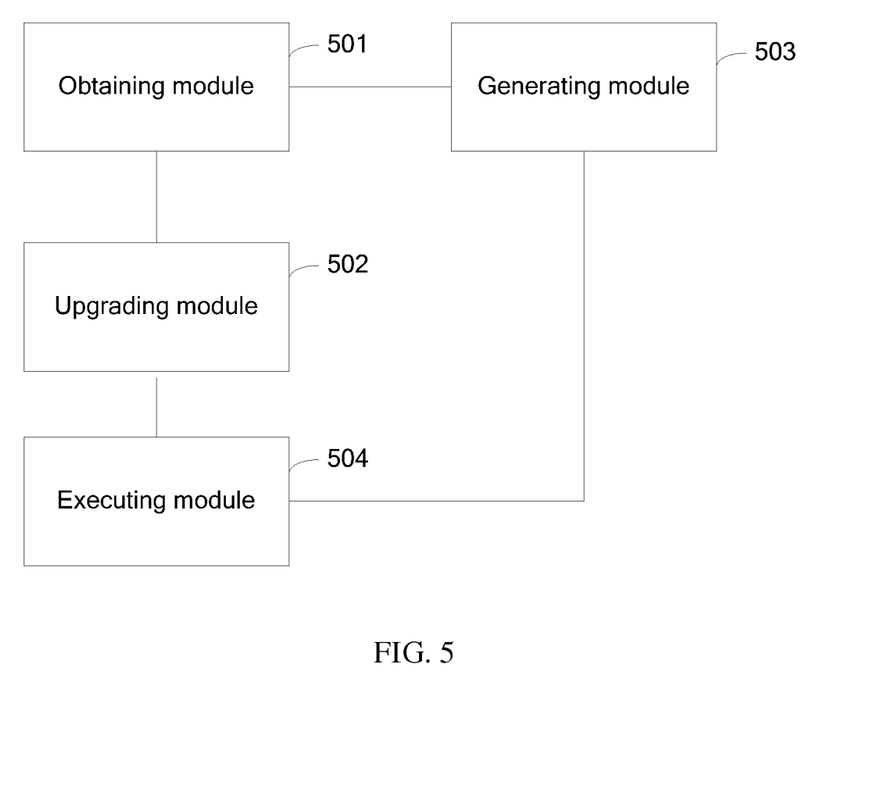
FIG. 5 is a structural block diagram of a system differential upgrade apparatus according to Embodiment 5 of the present invention.

As shown in FIG. 5, an embodiment of the present invention provides a system differential upgrade apparatus. The apparatus includes: an obtaining module 501 configured to obtain an upgrade script and upgrade data, where the upgrade script includes a file processing command, and the file processing command includes an identifier of a file to be upgraded; an upgrading module 502 configured to upgrade the file to be upgraded according to the upgrade script and the upgrade data obtained by the obtaining module 501, where the file to be upgraded corresponds to the identifier of the file to be upgraded in the file processing command; a generating module 503 configured to generate, according to the file processing command that is being executed by the upgrading module 502 currently and is in the upgrade script, and the file to be upgraded corresponding to the file processing command that is being executed currently, rollback data and a rollback script corresponding to the file to be upgraded; and an executing module 504 configured to execute the rollback script according to the rollback data generated by the generating module 503 when the upgrade performed by the upgrading module 502 fails.

Further, the file processing command in the upgrade script that is obtained by the obtaining module 501 includes a file deletion command, and the upgrade data is empty. The generating module 503 is specifically configured to: before the upgrading module 502 executes the file deletion command in the upgrade script, save file content, a file path, and a file property of the file to be upgraded that corresponds to the file deletion command as the rollback data; and set a file adding command and a file property setting command in the rollback script, where the file adding command and the file property setting command include the identifier of the file to be upgraded that corresponds to the file deletion command.

Still further, the file processing command in the upgrade script that is obtained by the obtaining module 501 includes a patching command, and the upgrade data includes a first patch file that upgrades the file to be upgraded corresponding to the patching command to a new file. The generating module 503 is specifically configured to: before the upgrading module 502 generates the new file, save a second patch file that restores the new file to the file to be upgraded corresponding to the patching command in the upgrade script as the rollback data; and set a patching command in the rollback script, where the patching command includes the identifier of the file to be upgraded that corresponds to the patching command in the upgrade script.

Still further, the file processing command in the upgrade script that is obtained by the obtaining module 501 includes the file adding command and the file property setting command, and the upgrade data includes file content, a file path, and a file property of the file to be upgraded corresponding to the file adding command. The generating module 503 is specifically configured to set a file deletion command in the rollback script, where the file deletion command includes the identifier of the file to be upgraded that corresponds to the file adding command in the upgrade script. At this time, the rollback data is empty.

Preferably, the generating module 503 is further configured to set a rollback progress displaying command in the rollback script.

In the embodiment of the present invention, rollback data and a rollback script corresponding to a current file to be upgraded are generated according to the file processing command that is being executed currently in an upgrade script and the file to be upgraded corresponding to the file processing command that is being executed currently. When the upgrade fails, the rollback script is executed according to the rollback data, which may restore a system to that before the upgrade, thereby avoiding a case that the system runs improperly and cannot start when the upgrade fails.

Embodiment 6

Figure 6:
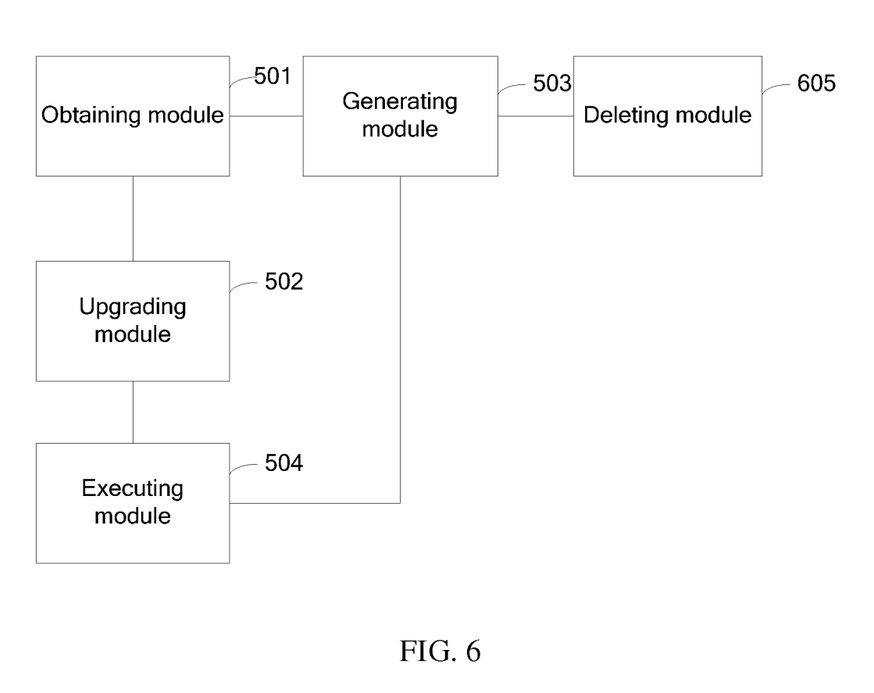
FIG. 6 is a structural block diagram of a system differential upgrade apparatus according to Embodiment 6 of the present invention.

As shown in FIG. 6, an embodiment of the present invention provides a system differential upgrade apparatus. Different from the apparatus in Embodiment 5, this apparatus further includes a deleting module 605 configured to delete a rollback script and rollback data generated by a generating module 503 after an upgrading module 502 performs an upgrade successfully, or an executing module 504 executes the rollback script according to the rollback data.

In the embodiment of the present invention, rollback data and a rollback script corresponding to a current file to be upgraded are generated according to the file processing command that is being executed currently in an upgrade script and the file to be upgraded corresponding to the file processing command that is being executed currently. When the upgrade fails, the rollback script is executed according to the rollback data, which may restore a system to that before the upgrade, thereby avoiding a case that the system runs improperly and cannot start when the upgrade fails.

An OTA upgrade apparatus in Embodiment 5 or 6 is generally installed in a mobile terminal.

Embodiment 7

An embodiment of the present invention provides a mobile terminal, where the mobile terminal includes the system differential upgrade apparatus provided in Embodiment 5 or 6.

Specifically, the mobile terminal may be a mobile phone, a notebook computer, a personal digital assistant (PDA), or the like.

In the embodiment of the present invention, rollback data and a rollback script corresponding to a current file to be upgraded are generated according to the file processing command that is being executed currently in an upgrade script and the file to be upgraded corresponding to the file processing command that is being executed currently. When the upgrade fails, the rollback script is executed according to the rollback data, which may restore a system to that before the upgrade, thereby avoiding a case that the system runs improperly and cannot start when the upgrade fails.

It should be noted that, the division of the foregoing functional modules is merely used as an example for description when the system differential upgrade apparatus and the mobile terminal provided by the foregoing embodiments perform an upgrade. In an actual application, the foregoing functions may be assigned to different functional modules for completion according to a requirement, That is, an internal structure of the apparatus may be divided into different functional modules so as to complete all or part of the functions described above. Moreover, the system differential upgrade apparatus and the mobile terminal provided by the foregoing embodiments and the system differential upgrade method embodiments belong to the same inventive concept, of which a specific implementation process is described in the method embodiments in detail, and are not described herein again.

A person of ordinary skill in the art may understand that all or a part of the steps of the embodiments may be implemented by hardware or a program instructing relevant hardware. The program may be stored in a computer readable storage medium. The storage medium may include a read-only memory, a magnetic disk, or an optical disc.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

What is claimed is:

1. A system differential upgrade method, comprising:
    obtaining an upgrade script and upgrade data, wherein the upgrade script comprises a file processing command and a file check command, wherein the file processing command comprises an identifier of a file to be upgraded, and wherein the file check command comprises a requirement of the file to be upgraded;
    saving file content, a file path, and a file property of the file to be upgraded, wherein the file property comprises at least one of a user identifier (UID), a group identifier (GID), and an operation permission;
    checking, according to the file check command, whether the file to be upgraded is of a specified version and meets the requirement of the file to be upgraded;
    upgrading, after saving the file content, the file path, and the file property and checking whether the file to be upgraded is of the specified version, the file to be upgraded according to the upgrade script and the upgrade data when the file to be upgraded is of the specified version and meets the requirement of the file to be upgraded, wherein the file to be upgraded corresponds to the identifier of the file to be upgraded in the file processing command;
    generating, according to the file processing command that is being executed currently in the upgrade script and the file to be upgraded corresponding to the file processing command that is being executed currently, rollback data and a rollback script corresponding to the file to be upgraded, wherein generating the rollback data and the rollback script comprises adding a patching command, the file check command, and a copy progress displaying command to the rollback script; and executing the rollback script according to the rollback data, the patching command, the file check command, and the copy progress displaying command when the upgrade fails.

2. The method according to claim 1, wherein the file processing command comprises a file deletion command, wherein the upgrade data is empty, and wherein generating, according to the file processing command that is being executed currently in the upgrade script and the file to be upgraded corresponding to the file processing command that is being executed currently, the rollback data and the rollback script corresponding to the file to be upgraded comprises:

saving the file content, the file path, and the file property of the file to be upgraded that corresponds to the file deletion command as the rollback data before executing the file deletion command; and setting a file adding command and a file property setting command in the rollback script, wherein the file adding command and the file property setting command comprise the identifier of the file to be upgraded that corresponds to the file deletion command, wherein generating, according to the file processing command that is being executed currently in the upgrade script and the file to be upgraded corresponding to the file processing command that is being executed currently, the rollback data and the rollback script corresponding to the file to be upgraded further comprises setting a rollback progress displaying command in the rollback script, and wherein the method further comprises displaying a rollback progress in a manner of a percentage.

3. The method according to claim 1, wherein the file processing command comprises a patching command, wherein the upgrade data comprises a first patch file that upgrades the file to be upgraded corresponding to the patching command to a new file, and wherein generating, according to the file processing command that is being executed currently in the upgrade script and the file to be upgraded corresponding to the file processing command that is being executed currently, the rollback data and the rollback script corresponding to the file to be upgraded comprises:

saving a second patch file that restores the new file to the file to be upgraded corresponding to the patching command as the rollback data before generating the new file; and setting a patching command in the rollback script, wherein the patching command comprises the identifier of the file to be upgraded that corresponds to the patching command in the upgrade script, and wherein generating, according to the file processing command that is being executed currently in the upgrade script and the file to be upgraded corresponding to the file processing command that is being executed currently, the rollback data and the rollback script corresponding to the file to be upgraded further comprises setting a rollback progress displaying command in the rollback script.

4. The method according to claim 1, wherein the file processing command comprises a file adding command and a file property setting command, wherein the upgrade data comprises the file content, the file path, and the file property of the file to be upgraded that corresponds to the file adding command, wherein generating, according to the file processing command that is being executed currently in the upgrade script and the file to be upgraded corresponding to the file processing command that is being executed currently, the rollback data and the rollback script corresponding to the file to be upgraded comprises setting a file deletion command in the rollback script, wherein the file deletion command comprises the identifier of the file to be upgraded that corresponds to the file adding command, and wherein generating, according to the file processing command that is being executed currently in the upgrade script and the file to be upgraded corresponding to the file processing command that is being executed currently, the rollback data and the rollback script corresponding to the file to be upgraded further comprises setting a rollback progress displaying command in the rollback script.

5. The method according to claim 1, further comprising deleting the rollback data and the rollback script after the upgrade succeeds or the rollback script is executed.

6. The method according to claim 1, wherein the file to be upgraded is upgraded simultaneously while the rollback data and the rollback script are being generated, wherein the system differential upgrade is performed Over The Air (OTA) on a mobile terminal, and wherein the rollback script is executed according to the rollback data when the upgrade fails comprises the mobile terminal being restored to a same state as before the system differential upgrade is started such that the mobile terminal can start and run properly.

7. The method according to claim 1, wherein the upgrade script comprises multiple file processing commands, wherein the multiple processing commands comprise a delete file command, a patch file command, and an add file command, wherein the delete file command causes a mobile terminal to delete an existing file, wherein the patch file command causes the mobile terminal to patch another existing file, and wherein the add file command causes the mobile terminal to add a new file.

8. The method according to claim 1, wherein the system differential upgrade method comprises an Over The Air (OTA) upgrade, wherein the OTA upgrade does not require downloading of a complete data package, wherein the upgrade script and the upgrade data are obtained OTA through a wireless network, wherein the wireless network comprises a Global System for Mobile Communications (GSM) network, a Code Division Multiple Access (CDMA) network, or a Wideband Code Division Multiple Access (WCDMA) network, and wherein the OTA upgrade is applied to a mobile terminal.

9. The method according to claim 1, wherein whether the upgrade succeeds or fails is determined based upon a global variable, wherein the global variable comprises a first value that indicates that the upgrade succeeds and a second value that indicates that the upgrade fails, wherein the first value is a1, wherein the second value is a2, and wherein the upgrade is determined to have succeeded when the global variable is equal to a1 and the upgrade is determined to have failed when the global variable is equal to a2.

10. The method according to claim 1, wherein the file processing command comprises a file delete command, wherein the file delete command identifies a file on a mobile terminal that is to be deleted, wherein the upgrade data is empty, wherein an update thread UPDATE-BINARY is started, wherein a file deletion command DELETE is read from the upgrade script, wherein the file deletion command DELETE deletes the file on the mobile terminal, wherein before executing the file deletion command DELETE, file content, file path, and file property information of the file on the mobile terminal are saved to the rollback script, and wherein after the upgrade fails and the rollback script is executed, the rollback script is deleted.

11. The method according to claim 1, wherein the file processing command comprises a patch file command, wherein the patch file command identifies a file and a version of the file on a mobile terminal that is to be patched, wherein a patch file command APPLY_PATCH is read from the upgrade script, wherein the patch file command APPLY_PATCH generates a patch file FILE.PATCH and then renames the patch file FILE.PATCH to a name of the file on the mobile terminal that is to be patched, wherein before executing the patch file command APPLY_PATCH, file content, file path, and file property information of the file on the mobile terminal are saved to the rollback script, and wherein after the upgrade fails and the rollback script is executed, the rollback script is deleted.

12. The method according to claim 1, wherein the file processing command comprises a file add command, wherein the file add command identifies a file that is to be added to a mobile terminal, wherein an update thread UPDATE-BINARY is started, wherein a file add command PACKAGE-EXTRACT-FILE is read from the upgrade script and is executed to add the file to the mobile terminal, wherein before executing the file add command PACKAGE-EXTRACT-FILE, file content, file path, and file property information of the file on the mobile terminal are saved to the rollback script, and wherein after the upgrade fails and the rollback script is executed, the rollback script is deleted.

13. A terminal comprising:
a transmitter;
a memory; and
a processor coupled to the memory and the transmitter, wherein the processor is configured to:
obtain an upgrade script and upgrade data, wherein the upgrade script comprises a file processing command and a file check command, wherein the file processing command comprises an identifier of a file to be upgraded, and wherein the file check command comprises a requirement of the file to be upgraded;
save file content, a file path, and a file property of the file to be upgraded, wherein the file property comprises at least one of a user identifier (UID), a group identifier (GID), and an operation permission;
check, according to the file check command, whether the file to be upgraded is of a specified version and meets the requirement of the file to be upgraded;
upgrade, after saving the file content, the file path, and the file property and checking whether the file to be upgraded is of the specified version, the file to be upgraded according to the upgrade script and the upgrade data when the file to be upgraded is of the specified version and meets the requirement of the file to be upgraded, wherein the file to be upgraded corresponds to the identifier of the file to be upgraded in the file processing command;
generate, according to the file processing command that is being executed currently in the upgrade script and the file to be upgraded corresponding to the file processing command that is being executed currently, rollback data and a rollback script corresponding to the file to be upgraded, wherein generating the rollback data and the rollback script comprises adding a patching command, the file check command, and a copy progress displaying command to the rollback script; and execute the rollback script according to the rollback data, the patching command, the file check command, and the copy progress displaying command when the upgrade fails.

14. The terminal according to claim 13, wherein the file processing command comprises a file deletion command, wherein the upgrade data is empty, and wherein the processor is further configured to:
save the file content, the file path, and the file property of the file to be upgraded that corresponds to the file deletion command as the rollback data before executing the file deletion command;
set a file adding command and a file property setting command in the rollback script, wherein the file adding command and the file property setting command comprise the identifier of the file to be upgraded that corresponds to the file deletion command; and
set a rollback progress displaying command in the rollback script.

15. The terminal according to claim 13, wherein the file processing command comprises a patching command, wherein the upgrade data comprises a first patch file that upgrades the file to be upgraded corresponding to the patching command to a new file, and wherein the processor is further configured to:
save a second patch file that restores the new file to the file to be upgraded corresponding to the patching command as the rollback data before generating the new file;
set a patching command in the rollback script, wherein the patching command comprises the identifier of the file to be upgraded that corresponds to the patching command in the upgrade script; and
set a rollback progress displaying command in the rollback script.

16. The terminal according to claim 13, wherein the file processing command comprises a file adding command and a file property setting command, wherein the upgrade data comprises the file content, the file path, and the file property of the file to be upgraded that corresponds to the file adding command, wherein the processor is further configured to set a file deletion command in the rollback script, wherein the file deletion command comprises the identifier of the file to be upgraded that corresponds to the file adding command, and wherein the processor is further configured to set a rollback progress displaying command in the rollback script.

17. The terminal according to claim 13, wherein the processor is further configured to delete the rollback data and the rollback script.

18. A computer program product for use in conjunction with a terminal comprising a transmitter, the computer program product comprising a computer readable storage medium and a computer program mechanism embedded therein, and the computer program mechanism comprising instructions for:
obtaining an upgrade script and upgrade data, wherein the upgrade script comprises a file processing command and a file check command, wherein the file processing command comprises an identifier of a file to be upgraded, and wherein the file check command comprises a requirement of the file to be upgraded;
saving file content, a file path, and a file property of the file to be upgraded, wherein the file property comprises at least one of a user identifier (UID), a group identifier (GID), and an operation permission;
checking, according to the file check command, whether the file to be upgraded is of a specified version and meets the requirement of the file to be upgraded;

upgrading, after saving the file content, the file path, and the file property and checking whether the file to be upgraded is of the specified version, the file to be upgraded according to the upgrade script and the upgrade data when the file to be upgraded is of the specified version and meets the requirement of the file to be upgraded, wherein the file to be upgraded corresponds to the identifier of the file to be upgraded in the file processing command;

generating, according to the file processing command that is being executed currently in the upgrade script and the file to be upgraded corresponding to the file processing command that is being executed currently, rollback data and a rollback script corresponding to the file to be upgraded, wherein generating the rollback data and the rollback script comprises adding a patching command, the file check command, and a copy progress displaying command to the rollback script; and executing the rollback script according to the rollback data, the patching command, the file check command, and the copy progress displaying command when the upgrade fails.

19. The computer program product according to claim 18, wherein the computer program mechanism further comprises instructions for determining whether the file processing command is for deleting, patching, or adding the file to be upgraded.

20. The terminal according to claim 13, wherein the file to be upgraded is upgraded simultaneously while the rollback data and the rollback script are being generated, wherein the system differential upgrade is performed Over The Air (OTA) on a mobile terminal, wherein the rollback script is executed according to the rollback data when the upgrade fails comprises the mobile terminal being restored to a same state as before the system differential upgrade is started such that the mobile terminal can start and run properly, wherein the OTA upgrade does not require downloading of a complete data package, wherein the upgrade script and the upgrade data are obtained OTA through a wireless network, wherein the wireless network comprises a Global System for Mobile Communications (GSM) network, a Code Division Multiple Access (CDMA) network, or a Wideband Code Division Multiple Access (WCDMA) network, wherein whether the upgrade succeeds or fails is determined based upon a global variable, wherein the global variable comprises a first value that indicates that the upgrade succeeds and a second value that indicates that the upgrade fails, wherein the first value is a1, wherein the second value is a2, and wherein the upgrade is determined to have succeeded when the global variable is equal to a1 and the upgrade is determined to have failed when the global variable is equal to a2.

* * * * *